United States Patent
Harrison (10) Patent No.: US 8,261,596 B2
(45) Date of Patent: Sep. 11, 2012

(54) SEAL ASSEMBLY WITH LEAK MONITORING

(75) Inventor: Lannie D. Harrison, Dickinson, TX (US)

(73) Assignee: Lockheed Martin Company, Bethesda, MD (US)

( * ) Notice: Subject to any disclaimer, the term of this patent is extended or adjusted under 35 U.S.C. 154(b) by 337 days.

(21) Appl. No.: 12/656,618

(22) Filed: Feb. 4, 2010

(65) Prior Publication Data
US 2011/0185793 A1    Aug. 4, 2011

(51) Int. Cl.
*G01M 3/08* (2006.01)
(52) U.S. Cl. .............................. 73/46; 73/49.8
(58) Field of Classification Search ............... 73/40.5 R, 73/46, 49.8
See application file for complete search history.

(56) References Cited

U.S. PATENT DOCUMENTS

| | | | | |
|---|---|---|---|---|
| 2,350,867 A * | 6/1944 | Bean et al. | ....................... | 285/96 |
| 2,485,497 A * | 10/1949 | Lemley et al. | ................... | 285/96 |
| 4,019,371 A * | 4/1977 | Chaplin et al. | ..................... | 73/46 |
| 4,274,007 A * | 6/1981 | Baatz et al. | ................. | 250/506.1 |
| 4,410,186 A * | 10/1983 | Pierce, Jr. | ....................... | 277/318 |
| 4,420,970 A * | 12/1983 | Organi | .............................. | 73/46 |
| 4,888,979 A * | 12/1989 | Steeper | .......................... | 73/40.7 |
| 5,074,663 A * | 12/1991 | Winterton et al. | ............. | 356/244 |
| 5,170,659 A * | 12/1992 | Kemp | .................................. | 73/46 |
| 5,182,076 A * | 1/1993 | de Seroux et al. | ............. | 376/250 |
| 5,461,904 A * | 10/1995 | Baker | ................................ | 73/46 |
| 6,000,278 A * | 12/1999 | Hystad | ............................... | 73/46 |
| 6,223,587 B1 * | 5/2001 | Chiocca | .......................... | 73/49.6 |
| 6,299,216 B1 * | 10/2001 | Thompson | ....................... | 285/93 |
| 7,523,644 B2 * | 4/2009 | Van Winkle | ....................... | 73/37 |
| 7,814,778 B2 * | 10/2010 | McConnell et al. | ............ | 73/49.8 |

* cited by examiner

*Primary Examiner* — John Fitzgerald
(74) *Attorney, Agent, or Firm* — Oliff & Berridge, PLC (57) ABSTRACT

A seal assembly is provided for a joint between a first pipe segment and a second pipe segment. The seal assembly has at least one primary sealing member mounted on the first flange and at least one supplemental sealing member mounted on the first flange between the first pipe segment and the at least one primary sealing member. A first sealed containment area is formed between the at least one primary and at least one supplemental sealing members when the sealing members are compressed. A plurality of conduits are formed in the first flange. A first supply conduit is located between the at least one primary sealing member and the at least one supplemental sealing member and a return conduit is located so that the at least one primary sealing member is positioned between the supply conduit and the return conduit.

19 Claims, 9 Drawing Sheets

SEAL ASSEMBLY WITH LEAK MONITORING

BACKGROUND

In many applications, fluids are transported across various distances through pipe systems. These pipe systems are constructed from pipe segments that are secured together by mechanical or other means. Because of imperfections resulting from the manufacturing process, small gaps can often remain between the pipe segments when they are secured together. These gaps can be large enough to allow an undesired amount of fluid to leak out of the pipe.

To reduce or prevent such leakage of fluid, the pipe segments are typically fitted with seal assemblies. These seal assemblies form barriers in the pipe system joints restricting the flow of fluid through the gaps and reducing the amount of fluid leaking out of the pipe system. Accordingly, the integrity of the seal assemblies is critical to the prevention of fluid leakage. Thus, it is desired to periodically verify the integrity of the seal assembly and the overall performance of the pipe system.

Leak testing is one method used to verify the integrity of seal assemblies. Leak tests are performed by creating a pressure difference between two sides of a seal assembly and measuring the amount of fluid flowing from one side to the other. However, pipe systems are often located in inaccessible or remote locations, thereby making leak testing difficult. In addition, to ensure accurate results, the leak tests often require that the pipe system be shut down during leak testing. Thus, verifying the integrity of a seal assembly through leak testing could still lead to an undesired fluid leak if the seal assembly fails while the pipe system is in operation.

SUMMARY

In a first embodiment, a seal assembly for a joint between a first pipe segment having a first flange and a second pipe segment having a second flange can include at least one primary sealing member mounted on the first flange and forming a loop around the first pipe segment and at least one supplemental sealing member mounted on the first flange between the first pipe segment and the at least one primary sealing member, the at least one supplemental sealing member forming a loop around the first pipe segment. The seal assembly can also include a first sealed containment area that is formed between the at least one primary and at least one supplemental sealing members when the at least one primary and at least one supplemental sealing members are compressed and a plurality of conduits formed in the first flange and extending from a first face of the first flange oriented away from the second flange to a second face of the first flange oriented toward the second flange. The plurality of conduits can include a first supply conduit located between the at least one primary sealing member and the at least one supplemental sealing member and a return conduit located so that the at least one primary sealing member is positioned between the supply conduit and the return conduit.

In another embodiment, a method for testing a leak rate of a seal assembly for a joint between a first pipe segment having a first flange and a second pipe segment having a second flange can include forming a plurality of sealed containment areas by compressing the first and second flanges together and pressurizing one of the plurality of sealed containment areas by supplying a fluid to the one of the plurality of sealed containment areas via a supply conduit formed in the first flange. The method can also include creating a pressure differential between the pressurized sealed containment area and another sealed containment area to draw fluid from the pressurize sealed containment area to the another sealed containment area.

In another embodiment, a pipe assembly for transporting a fluid can include a plurality of pipe segments. Each pipe segment can include a first flange located at a first end of the pipe segment and a second flange located at a second end of the pipe segment. Each pipe segment can also include a seal assembly. The seal assembly can include at least one primary sealing member mounted on the first flange and forming a loop around the first pipe segment and at least one supplemental sealing member mounted on the first flange between the first pipe segment and the at least one primary sealing member, the at least one supplemental sealing member forming a loop around the first pipe segment. The seal assembly can also include a first sealed containment area that is formed between the at least one primary and at least one supplemental sealing members when the at least one primary and at least one supplemental sealing members are compressed. The seal assembly can also include a first supply conduit located between the at least one primary sealing member and the at least one supplemental sealing member, wherein the first supply conduit is formed in the first flange and extends from a first face of the first flange oriented away from the second flange to a second face of the first flange oriented toward the second flange.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Figure 1:
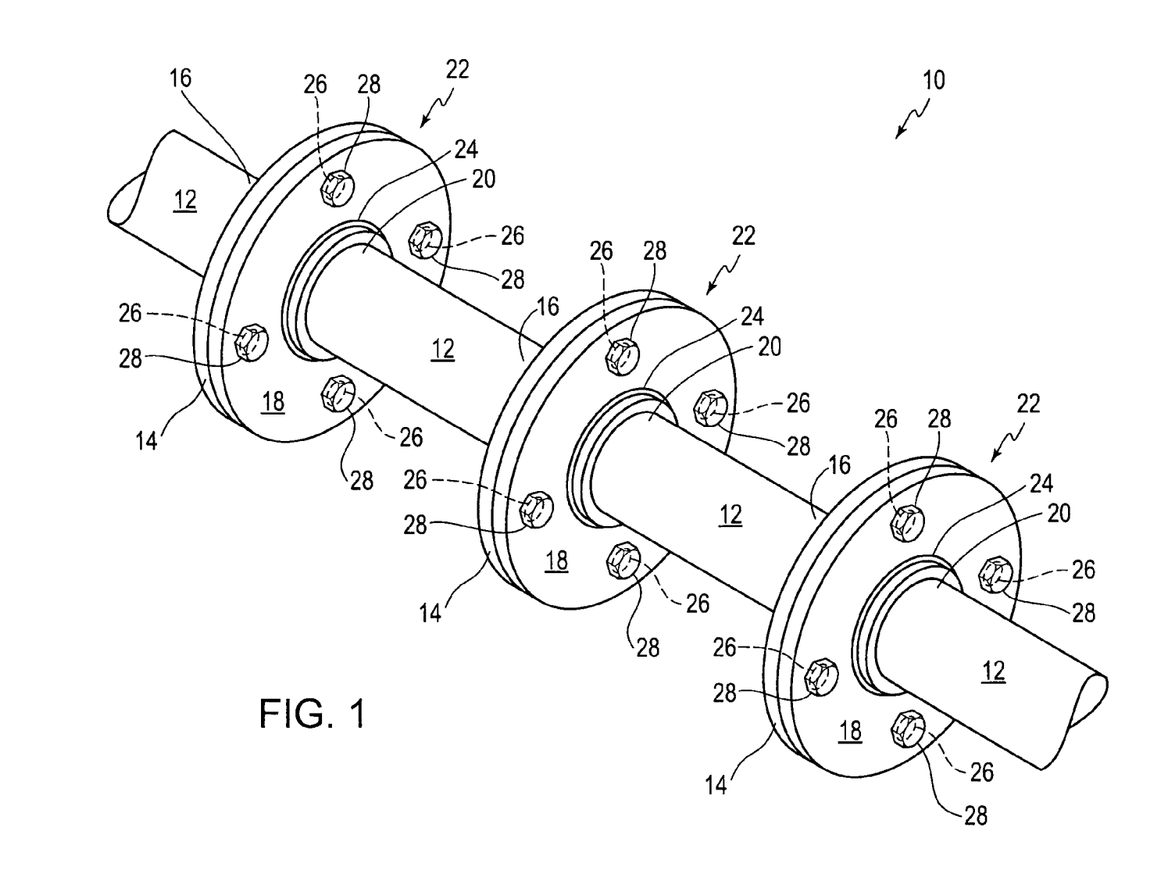
FIG. 1 illustrates an exemplary pipe assembly.

FIG. 1 shows an exemplary pipe assembly 10 for conveying a fluid. The pipe assembly 10 may include a plurality of pipe segments 12. The pipe assembly 10 may be any type of fluid conveyance system such as, for example, an oil or gas pipeline, an aqueduct, a building piping system, a piping system for an aircraft or shipping vessel, or any other type of fluid conveyance system. In addition, the pipe segments 12 may be made from any material such as, for example, iron, copper, plastic, or any other type of material capable of withstanding the pressure of and resisting the corrosive effect of fluid flowing through the pipe segment 12.

Each pipe segment 12 may include flanges for securing the pipe segment 12 to other pipe segments 12. In particular, each pipe segment 12 may include a grooved flange 14 located at a first end 16 of the pipe segment 12 and a monitoring flange 18 located at a second end 20 of the pipe segment 12. Each grooved flange 14 of the pipe segment 12 may be paired with a monitoring flange 18 of another pipe segment 12 to create a joint 22 through which the adjacent pipe segments 12 may be secured. The grooved and monitoring flanges 14 and 18 may be made from the same material as the pipe segments 12 or any other type of material that may be strong enough to maintain the connections between adjacent pipe segments 12 without failing. In addition, the grooved and monitoring flanges 14 and 18 may be secured to the pipe segments 12 by a securing device 24. The securing device 24 may be any type of device capable of securing the grooved and monitoring flanges 14 and 18 to the pipe segments 12 such as, for example, a weld.

Each grooved flange 14 and monitoring flange 18 may include a plurality of fastener holes 26 that may extend completely through the respective grooved and monitoring flanges 14 and 18. Each fastener hole 26 may be sized to receive a fastener 28 that may secure the grooved flange 14 to the corresponding monitoring flange 18. The fasteners 28 used to secure the grooved flange 14 to the corresponding monitoring flange 18 may be any type of fastening device such as, for example, bolts, screws, nails, clamps, adhesives, welds, or any other device capable of securing the grooved flange 14 to the corresponding monitoring flange 18.

Figure 2:
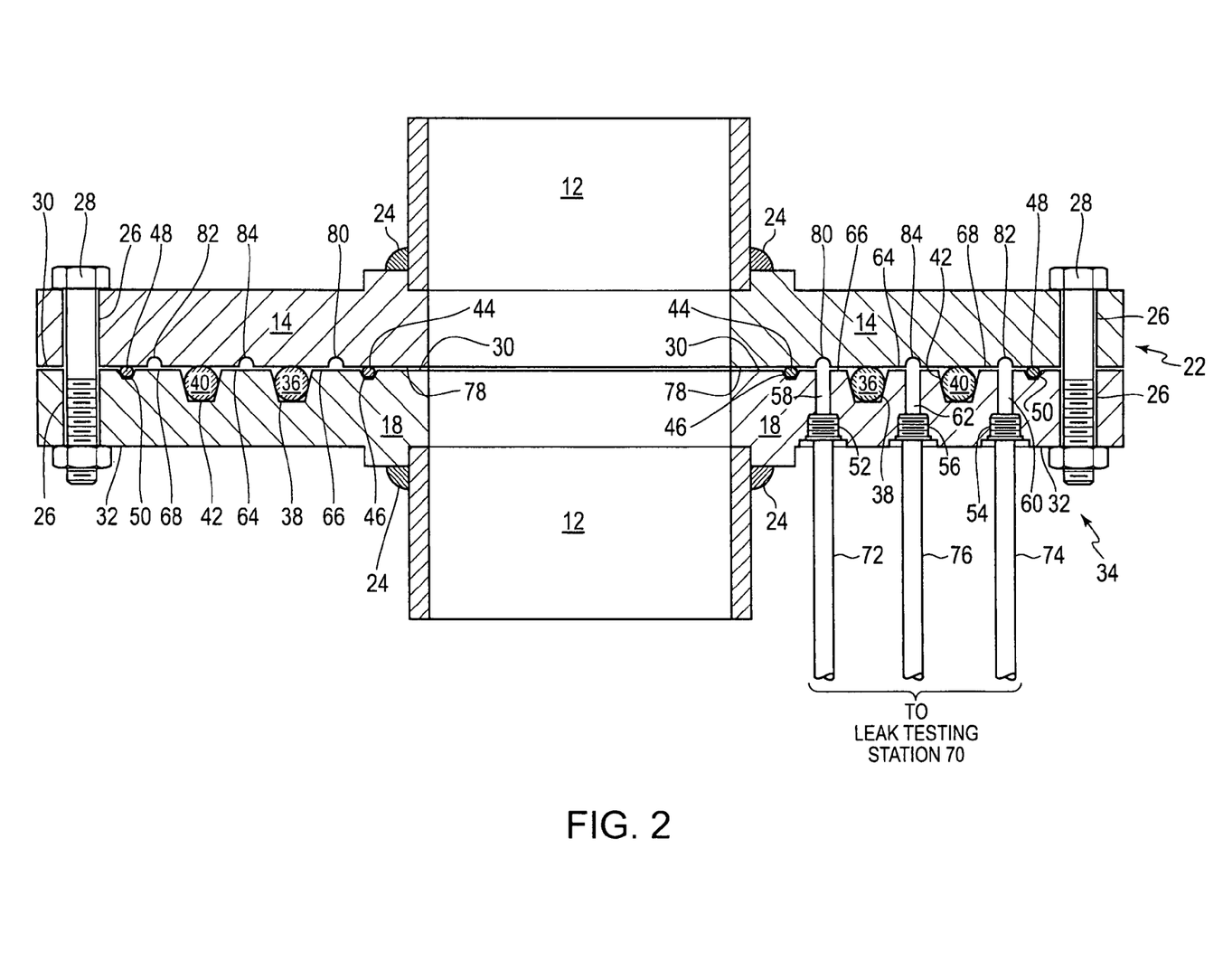
FIG. 2 illustrates a cross-section view of a joint of the exemplary pipe assembly of FIG. 1.

FIG. 2 shows a cross-section view of an exemplary joint 22 of the pipe assembly 10. As can be seen, the monitoring flange 18 may include a first surface 30 that may be oriented toward the grooved flange 14 when the joint 22 is formed. In addition, the monitoring flange 18 may include a second surface 32 that may be oriented away from the grooved flange 14. The monitoring flange 18 may further include a seal assembly 34.

The seal assembly 34 may be located on the monitoring flange 18 to seal any gap that may remain between the monitoring flange 18 and the grooved flange 14 when the joint 22 is formed. The seal assembly 34 may include a first primary seal member 36 situated within a first primary channel 38, a second primary seal member 40 situated in a second primary channel 42, a first supplemental seal member 44 situated in a first supplemental channel 46, a second supplemental seal member 48 situated in a second supplemental channel 50, an inner loop supply port 52, an outer loop supply port 54, a central return port 56, an inner loop supply conduit 58, an outer loop supply conduit 60, and a central return conduit 62.

The first and second primary channels 38 and 42 may be formed within the first surface 30 of the monitoring flange 18. In addition, the first and second primary channels 38 and 42 may form concentric loops around the pipe segment 12. Furthermore, the first and second primary channels 38 and 42 may be sized so that, when compressed, the first and second primary seal members 36 and 40 may form a fluid containing barrier without exerting a force against the grooved flange 14 that may interfere with the integrity of the joint 22.

The first and second primary seal members 36 and 40 may be mounted within the first and second primary channels 38 and 42 so that when compressed against the opposing face 18, the first and second primary seal members 36 and 40 may form a central containment area 64 on the first surface 30. In such a configuration, the first and second primary seal members 36 and 40 may prevent or restrict the flow of fluid into or out of the central containment area 64, thereby acting as redundant pressure seal members for preventing or restricting the fluid from leaking through the joint 22. It should be understood that the first and second primary seal members 36 and 40 may be rated for any compression volume load that may permit the first and second primary seal members 36 and 40 to prevent or restrict the flow of fluid out of the piping system 10 through the joint 22. In addition, the first and second primary seal members 36 and 40 may be made from any type of flexible, impervious material such as, for example, silicon-based rubber or any other type of rubber.

The first supplemental channel 46 may also be formed within the first surface 30 of the monitoring flange 18. In addition, the first supplemental channel 46 may form a loop around the pipe segment 12 and may be located between the first primary channel 38 and the outer surface of the pipe segment 12. Furthermore, the first supplemental channel 46 may be sized so that, when compressed, the first supplemental seal member 44 may form a fluid containing barrier without exerting a force against the grooved flange 14 that may interfere with the integrity of the joint 22.

The first supplemental seal member 44 may be mounted within the first supplemental channel 46 so that when compressed against the grooved flange 14, the first supplemental seal member 44 and the first primary seal member 36 may form an inner loop containment area 66 on the first surface 30. The first supplemental seal member 44 and the first primary seal member 36 may prevent or restrict the flow of fluid into or out of the inner loop containment area 66. In addition, the first supplemental seal member 44 may be made from the same or similar type of material as the first primary seal member 36. For example, the first supplemental seal member 44 may be formed from such flexible, impervious materials as silicon-based rubber, or any other type of rubber.

The first supplemental seal member 44 may be rated for a compression volume load needed to retain enough fluid in the inner loop containment area 66 for performing a leak test on the seal assembly 34. For example, the compression volume load rating of the first supplemental seal member 44 may be at least 1 psi. However, the pressure of fluid contained within the inner loop containment area 66 may contribute to the forces acting against the compression of the first primary seal member 36. In other words, increased fluid pressures within the inner loop containment area 66 may increase the force needed to compress the first primary seal member 36. This may compromise the performance of the first primary seal member 36 by interfering with the ability of the first primary seal member 36 to prevent or restrict the flow of fluid out of the piping system 10 through the joint 22. Therefore, the first supplemental seal member 44 may be rated for a minimal compression volume load necessary for the performance of the leak test. This minimal rating may be much lower than the compression volume load of the first primary seal member 36 to minimize any adverse effects the first supplemental seal member 44 may have on the performance of the first primary seal member 36.

The second supplemental channel 50 may also be formed within the first surface 30 of the monitoring flange 18. In addition, the second supplemental channel 50 may form a loop around the pipe segment 12 and may be located outside of the loop formed by the second primary channel 42. Furthermore, the second supplemental channel 50 may be sized so that, when compressed, the second supplemental seal member 48 may form a fluid containing barrier without exerting a force against the grooved flange 14 that may interfere with the integrity of the joint 22.

The second supplemental seal member 48 may be mounted within the second supplemental channel 50 so that when compressed against the grooved flange 14, the second supplemental seal member 48 and the second primary seal member 40 may form an outer loop containment area 68 on the first surface 30. The second supplemental seal member 48 and the second primary seal member 40 may prevent or restrict the flow of fluid into or out of the outer loop containment area 68. In addition, the second supplemental seal member 48 may be made from the same or similar type of material as the second primary seal member 40. For example, the second supplemental seal member 48 may be formed from such flexible, impervious materials as silicon-based rubber, or any other type of rubber.

Similar to the first supplemental seal member 44, the second supplemental seal member 48 may be rated for a compression volume load needed to retain enough fluid in the outer loop containment area 68 for performing the leak test on the seal assembly 22. For example, the second supplemental seal member 48 may be at least 1 psi. To minimize any adverse effects the second supplemental seal member 48 may have on the performance of the second primary seal member 40, the second supplemental seal member 48 may be rated for a minimal compression volume load necessary for the performance of the leak test. This minimal rating may be much lower than the compression volume load of the second primary seal member 40.

The inner and outer loop supply ports 52 and 54 may be openings in the second surface 32 of the monitoring flange 18 and may be fluidly connected to the inner and outer loop containment areas 66 and 68 via the inner and outer loop supply conduits 58 and 60, respectively. In addition, the inner and outer loop supply ports 52 and 54 may be fluidly connected to a leak testing station 70 via fluid passages 72 and 74. During testing and monitoring of the seal assembly 34, fluid from the leak testing station 70 may enter the monitoring flange 18 through one of the inner loop supply port 52 and outer loop supply port 54.

The central return port 56 may also be an opening in the second surface 32 of the monitoring flange 18 and may be fluidly connected to the central containment area 64 via the central return conduit 62. In addition, the central return port 56 may be fluidly connected to the leak testing station 70 via a fluid passage 76. During testing of the seal assembly 34, fluid may exit the monitoring flange 18 through the central return port 56 and be directed back to the leak testing station 70 via the fluid passage 76.

As can also be seen in FIG. 2, the grooved flange 14 may include a grooved surface 78 facing the monitoring flange 18. Grooved flange 14 may also include an inner loop supply groove 80, an outer loop supply groove 82, and a central return groove 84, each of which may be a groove carved into the grooved surface 78 of grooved flange 14.

The inner loop supply groove 80 may fluidly communicate with the inner loop supply conduit 58 and may form a loop within the inner loop containment area 66 extending around the pipe segment 12. The inner loop supply groove 80 may permit fluid from the inner loop supply conduit 58 to communicate with the entire inner loop containment area 66. Similar to the inner loop supply groove 80, the outer loop supply groove 82 may be fluidly communicate with the outer loop supply conduit 60 and may form a loop within the outer loop containment area 68 around the pipe segment 12. The outer loop supply groove 82 may permit fluid from the outer loop supply conduit 60 to communicate with the entire outer loop containment area 68.

The central return groove 84 may fluidly communicate with the central return conduit 62 and may form a loop within the central containment area 64 extending around the outer surface of the pipe segment 12. The central return groove may permit fluid within the entire central containment area 64 to communicate with the central return conduit 62.

During the performance of a leak test of the seal assembly 34, a test fluid may be supplied to the inner loop supply conduit 58 via the inner loop supply port 52. Once flowing through the inner loop supply conduit 58, the test fluid may flow through the inner loop supply groove 80 and may enter the inner loop containment area 66. Once in the inner loop containment area 66, the test fluid may be drawn through any defects in the first primary seal member 36 to the central containment area 64 by a pressure difference between the inner loop containment area 66 and the central containment area 64. Once in the central containment area 64 the fluid may be drawn through the central return groove 84 and the central return conduit 62 and ultimately out of the seal assembly 34 through the central return port 56 where the amount of fluid leaking through the first primary seal 36 can be measured. The same test can be repeated for the outer loop side of the seal assembly 34 but not at the same time as the testing of the inner loop side of the seal assembly 34.

Figure 3:
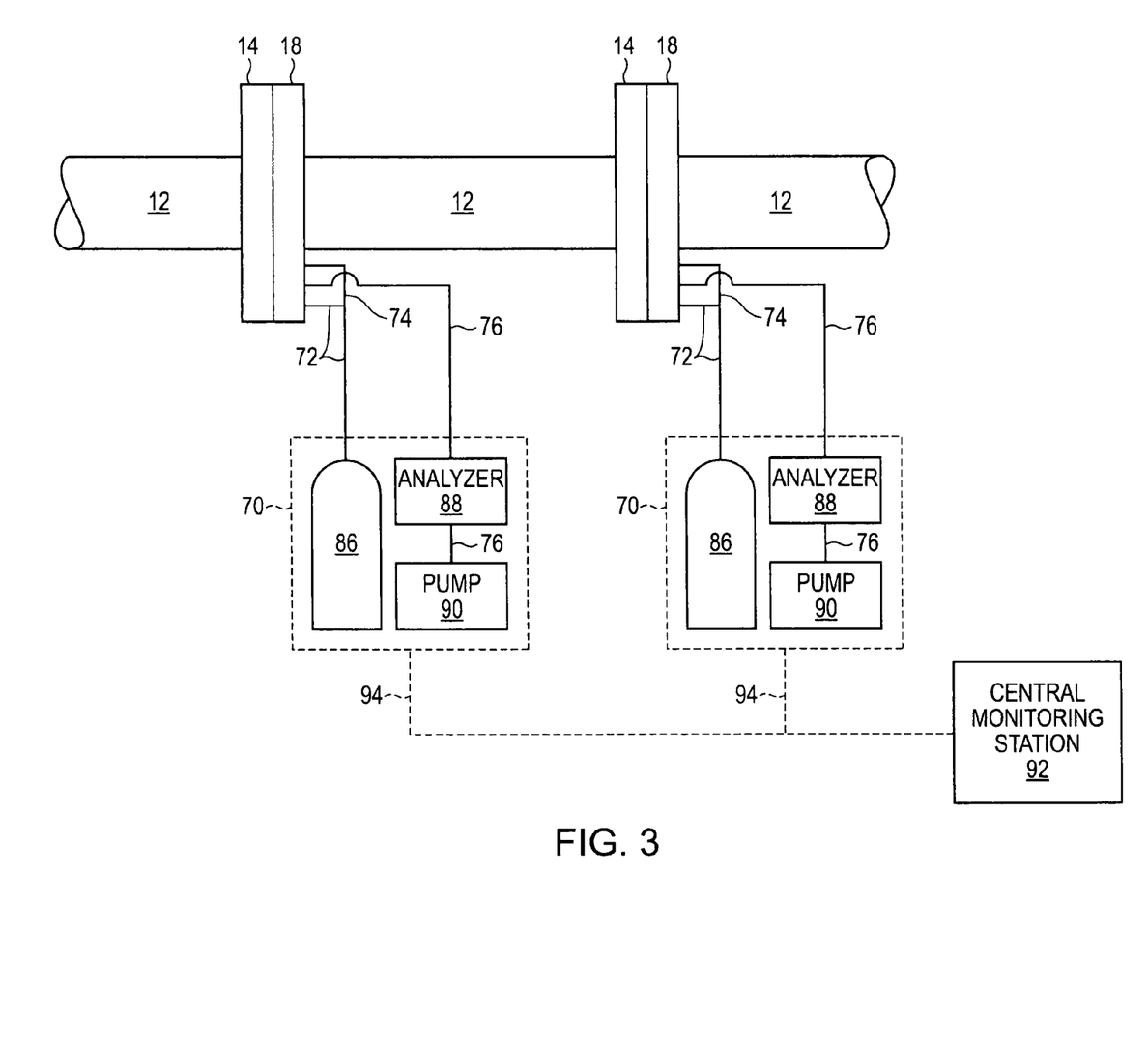
FIG. 3 illustrates the pipe assembly of FIG. 1 with a plurality of leak testing stations.

FIG. 3 illustrates an exemplary embodiment of the piping system 10 with multiple leak testing stations 70 with each leak testing station 70 being dedicated to a particular joint 22. Each leak testing station 70 may perform periodic leak tests and/or continuously monitor the integrity of an associated seal assembly 34. In addition, each leak testing station 70 may include a fluid source 86, an analyzer 88, and a pump 90. Although FIG. 3 illustrates one leak testing station 70 for each joint 22, it is contemplated that each leak testing station 70 may perform periodic leak tests on multiple joints 22.

The fluid source 86 may supply test fluid to the inner loop supply port 52 and the outer loop supply port 54 via the fluid passages 72 and 74, respectively. It should be understood that the fluid source 86 may supply test fluid to either the inner loop supply port 72 or the outer loop supply port 74, depending on which primary seal member is being tested. For example, if it is desired to test the integrity of the first primary seal member 36, test fluid may be supplied to only the inner loop supply port 72. In addition, if it is desired to test the integrity of the second primary seal member 40, test fluid may be supplied to only the outer loop supply port 74. The fluid source 86 may be any source capable of supplying a fluid to the seal assembly 22 for leak testing such as, for example, a tank. Alternatively, it is contemplated that all of the seal assemblies 34 may be supplied with test fluid from a central fluid source instead of individual fluid sources 86.

The pump 90 may draw test fluid from the central return conduit 62 via the fluid passage 76. While test fluid is flowing through the fluid passage 76, the analyzer 88 may detect an amount of test fluid flowing through the fluid passage 76. The analyzer 88 may transmit the sensed data to a central monitoring station 92 either wirelessly or via a communication line 94. The analyzer 88 may be any type of analyzing device capable of detecting an amount of fluid flowing through the fluid passage 76 such as, for example, a spectrometer. The pump 90 may be any type of pump capable of maintaining a desired pressure in the central containment area 64. It is contemplated that the analyzer 88 may detect any number or parameter of the fluid flowing through the fluid passage 76. Such parameters may include, for example, a mass, a flow rate, a chemical signature, a temperature, or any other parameter that may facilitate the determination of the amount of test fluid being drawn out of the seal assembly 34.

Because test fluid may be supplied to the monitoring flange 18 and then detected if leaking through the seal assembly 34, the leak testing station 70 may detect a weakness of the seal assembly 34 before any fluid flowing through the pipe segments 12 actually leaks through the seal assembly 34. In addition, the first supplemental seal member 44, the inner loop supply port 52, the inner loop supply conduit 60 and the inner loop supply groove 86 may be omitted. It should be understood, however, that the leak testing station 70 may still need to supply test fluid to the outer loop portion of the seal assembly 34 to test the integrity of the second primary seal member 40.

Each leak testing station 70 may operate independently and may perform a leak test prior to supplying fluid to the piping system 10. For example, a particular leak testing station 70 may perform a leak test on the inner loop side of the seal assembly 34 or the outer loop side of seal assembly 34 when a new fluid is directed through the pipe assembly 10. In addition, a particular leak testing station 70 may perform a leak test on the inner loop side of the seal assembly 34 for a first period of time and perform a leak test on the outer loop side of the seal assembly 34 for a second period of time after the first period of time. It is contemplated that when a particular leak testing station 70 is testing the seal assembly 34, the leak testing station 70 may test any portion of the seal assembly 34 for any duration of time and in any order. In addition, all of the data generated from performing leak tests on the seal assembly 34 may be transmitted to the central monitoring station 92, where a user may analyze the data. It is contemplated that the central monitoring station 92 may be omitted if desired.

Each leak testing station 70 may also operate under the control of the central monitoring station 92. For such a configuration, each leak testing station 70 may be operated independently or in conjunction with other leak testing stations 70. For example, the leak testing stations 70 of the pipe assembly 10 may operate one at a time. Alternatively, groups of leak testing station 70 may operate at the same time. In addition, the leak testing stations 70 may be operated so that for a predetermined period of time the leak testing stations 70 may perform leak tests one at a time and then for another predetermined period of time, groups of leak testing stations 70 may operate at the same time.

During the performance of a leak test, a test fluid may be supplied to the inner loop supply port 52 via the fluid passage 72. From the inner loop supply port 52, the test fluid may be directed to the inner loop supply groove 80 and the inner loop containment area 66 via the inner loop supply conduit 58. Once in the inner loop containment area 66, the test fluid may be drawn through any defects in the first primary seal member 36 to the central containment area 64 and the central return groove 84 by a pressure difference between the inner loop containment area 66 and the central containment area 64. Once in the central containment area 64, the test fluid may be drawn through the central return port 56 via the central return conduit 62 and ultimately out of the seal assembly 34 through the fluid passage 76 where the amount of fluid leaking through the first primary seal 36 can be measured. The same test can be repeated for the outer loop side of the seal assembly 34 either separately from or together with the inner loop side of the seal assembly 34.

Figure 4:
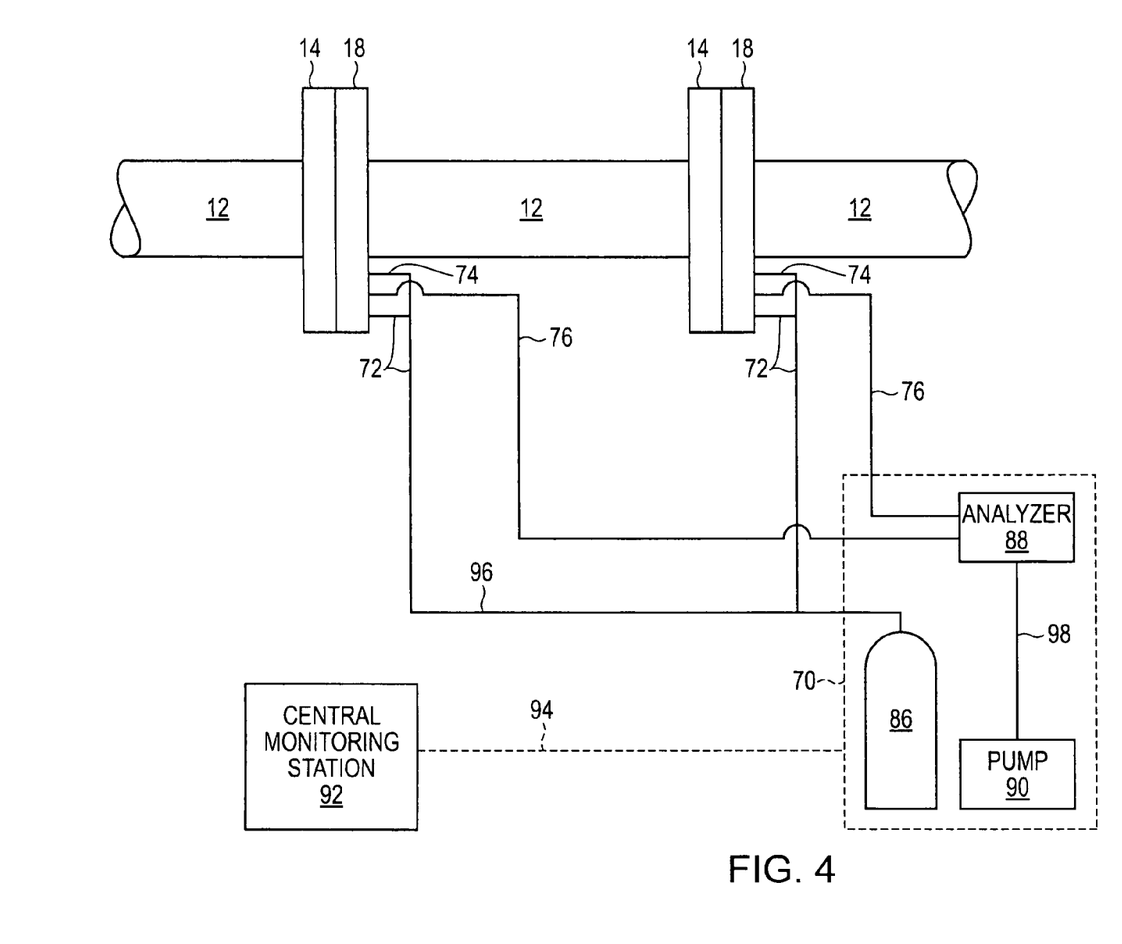
FIG. 4 illustrates the pipe assembly of FIG. 1 with one leak testing station.

FIG. 4 illustrates another exemplary embodiment of the piping system 10 with a single leak testing station 70 serving all of the joints 22 of the piping system 10. Similar to the embodiment illustrated in FIG. 3, the leak testing station 70 may perform leak tests for each seal assembly 34. In addition, the leak testing station 70 may include the fluid source 86, the analyzer 88, and the pump 90. The fluid passages 72 and 74 of each seal assembly 34 may be fluidly connected to a central fluid supply passage 94, which may be fluidly connected to the fluid source 86. In addition, each fluid passage 76 may be fluidly connected to the analyzer 88. The analyzer 88 may have multiple sensing devices (not shown) where each sensing device may be dedicated to a particular fluid passage 76. Downstream of the analyzer 88, the fluid passages 76 may merge into a central return passage 96 that may be fluidly connected to the pump 90.

It is contemplated that the single leak testing station 70 may be a portable device capable of being carried by an operator performing the leak test. The operator may connect the leak testing station 70 to the piping system 10 at any joint 22 that may be tested. Once connected to the joint 22, the portable leak testing station 70 may perform a leak test in the same manner as disclosed about for the stationary leak testing stations 70. The results of the leak test may be stored in a portable computer (not shown) or transmitted to the central monitoring station 92.

Figure 5:
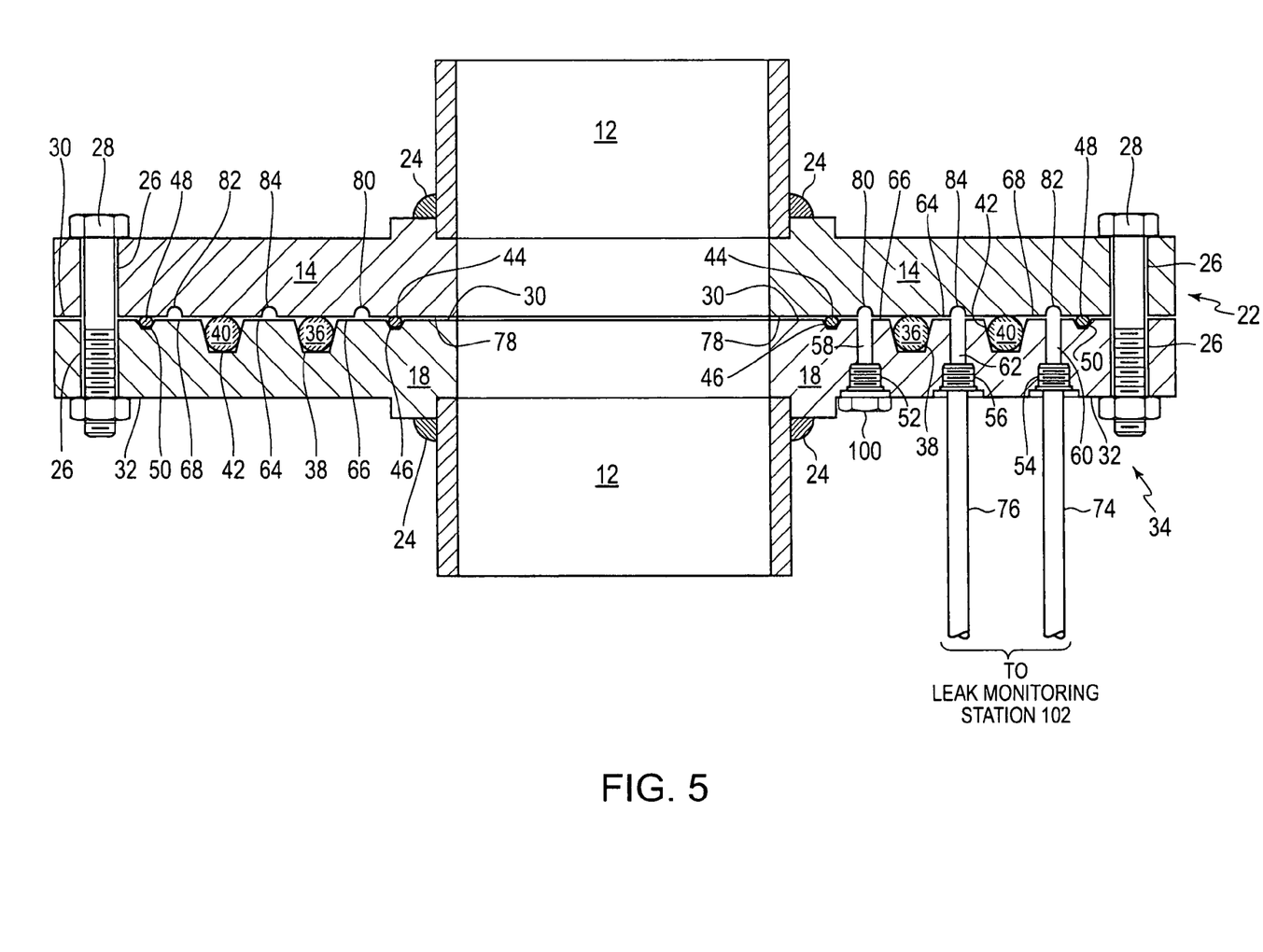
FIG. 5 illustrates another cross-section view of a joint of the exemplary pipe assembly of FIG. 1.

FIG. 5 shows a cross-section view of an exemplary joint 22 of the pipe assembly 10 configured for leak monitoring. Leak monitoring may be performed to detect a failure of the seal assembly 34 when the fluid flowing through the pipe segments 12 actually leaks through the seal assembly 34. In addition, the leak monitoring may be performed continuously or at predetermined intervals.

When configured for leak monitoring, the inner loop supply port 52 may be capped by a sealing cap 100. The sealing cap 100 may create a seal preventing fluid from entering or exiting the inner loop supply port 52. In addition, the central return port 56 and the outer supply port 54 may be fluidly connected to a leak monitoring system 102 via the fluid passages 74 and 76, respectively.

During leak monitoring, any fluid from the pipe segment 12 leaking through the first primary seal 36 may enter the central containment area 64. Once in the central containment area 64 the fluid may be drawn through the central return groove 84 and the central return conduit 62 and ultimately out of the seal assembly 34 through the central return port 56 where the amount of fluid leaking through the first primary seal 36 can be measured. In addition, any fluid from the pipe segment 12 leaking through the second primary seal 40 may enter the outer loop containment area 68. Once in the outer loop containment area 68, the fluid may be drawn through the outer loop supply groove 82 and the outer loop supply conduit 60 and ultimately out of the seal assembly 34 through the outer loop supply port 54 where the amount of fluid leaking through the first primary seal 36 can be measured.

Figure 6:
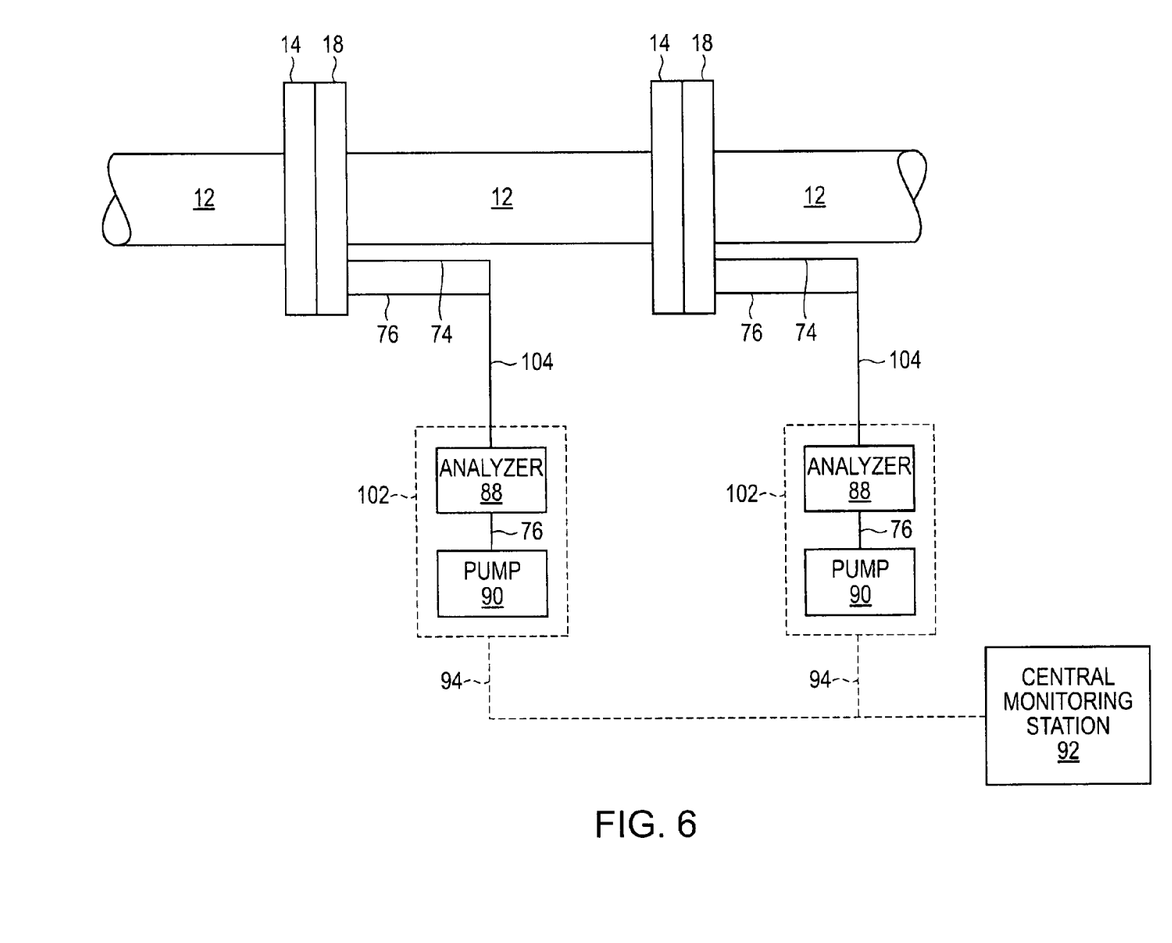
FIG. 6 illustrates the pipe assembly of FIG. 1 with a plurality of leak monitoring stations.

FIG. 6 illustrates an exemplary embodiment of the piping system 10 with multiple leak monitoring stations 102 with each leak monitoring station 102 being dedicated to a particular joint 22. Each leak monitoring station 102 may periodically or continuously monitor the integrity of an associated seal assembly 34. In addition, each leak monitoring station 102 may include the analyzer 88, and the pump 90. Although FIG. 3 illustrates one leak monitoring station 102 for each joint 22, it is contemplated that each leak monitoring station 102 may monitor multiple joints 22, if desired. It is further contemplated that the leak testing stations 70 may be converted to leak monitoring stations 102 by either removing or fluidly isolating the fluid source 86 from the leak monitoring station 102.

The pump 90 may draw fluid from the central return conduit 62 and the outer loop supply conduit 60 via the fluid passages 74 and 76, respectively. The fluid passages 74 and 76 may be fluidly connected to the analyzer 88 and the pump 90 via a fluid passage 104. While fluid is flowing through the fluid passage 104, the analyzer 88 may detect an amount of fluid flowing through the fluid passage 104. The analyzer 88 may transmit the sensed data to the central monitoring station 92 either wirelessly or via the communication line 94. It is contemplated that the analyzer 88 may detect any number or parameter of the fluid flowing through the fluid passage 104.

Such parameters may include, for example, a mass, a flow rate, a chemical signature, a temperature, or any other parameter that may facilitate the determination of the amount of test fluid being drawn out of the seal assembly 34.

Each leak monitoring station 102 may operate according to a predetermined schedule or predetermined factor. For example, a particular leak monitoring station 102 may monitor the seal assembly 34 once a day at a particular time of the day or when a new fluid is directed through the pipe assembly 10. In addition, each leak monitoring station 102 may continuously monitor the seal assembly 34. It is contemplated that all of the data generated by monitoring the seal assembly 34 may be transmitted to the central monitoring station 92, where a user may analyze the data. Alternatively, all of the data generated by monitoring the seal assembly 34 may be analyzed only at the leak monitoring station 102, and the central monitoring station 92 may be omitted.

Each leak monitoring station 102 may operate independently or under the control of the central monitoring station 92. When operating under the central monitoring station 92, each leak monitoring station 102 may be operated independently or in conjunction with other leak monitoring stations 102. For example, the leak monitoring stations 102 of the pipe assembly 10 may operate one at a time. Alternatively, groups of leak monitoring stations 102 may operate at the same time. In addition, the leak monitoring stations 102 may be operated so that for a predetermined period of time the leak monitoring stations 102 may perform leak tests one at a time and then for another predetermined period of time, groups of leak monitoring stations 102 may operate at the same time.

Figure 7:
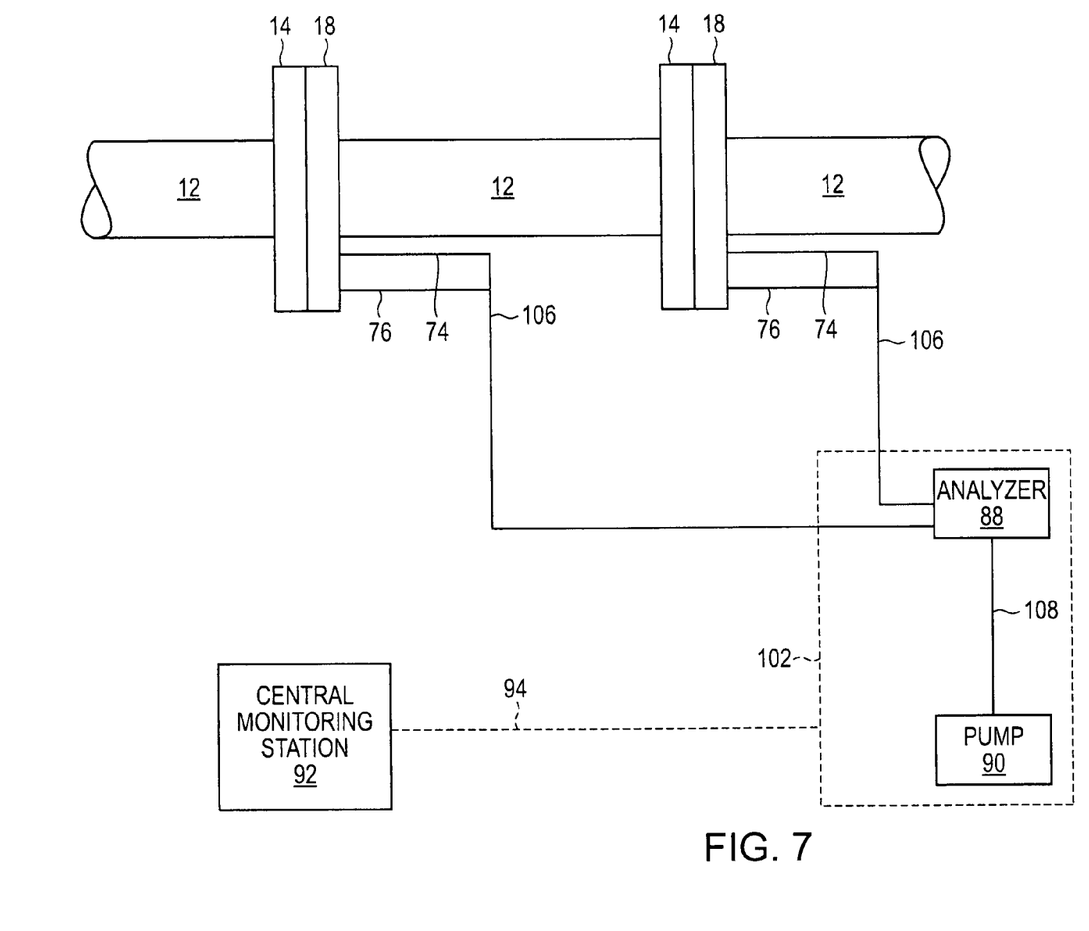
FIG. 7 illustrates the pipe assembly of FIG. 1 with one leak monitoring station.

FIG. 7 illustrates another exemplary embodiment of the piping system 10 with a single leak monitoring station 102 serving all of the joints 22 of the piping system 10. Similar to the embodiment illustrated in FIG. 6, the leak monitoring station 102 may monitor each seal assembly 34. In addition, the leak monitoring station 102 may include the analyzer 88 and the pump 90. The fluid passages 74 and 76 of each seal assembly 34 may be combined into a fluid passage 106, and each fluid passage 106 may be fluidly connected to the analyzer 88. The analyzer 88 may have multiple sensing devices (not shown) where each sensing device may be dedicated to a particular fluid passage 106. Downstream of the analyzer 88, the fluid passages 1066 may merge into a central passage 108 that may be fluidly connected to the pump 90.

It is contemplated that the single leak monitoring station 102 may be a portable device capable of being carried by an operator monitoring the seal assemblies 34. The operator may connect the leak monitoring station 102 to the piping system 10 at any joint 22 that may be monitored. Once connected to the joint 22, the portable leak monitoring station 102 may monitor the seal assembly 34 in the same manner as disclosed about for the stationary leak monitoring stations 102. The results of the leak monitoring may be stored in a portable computer (not shown) or transmitted to the central monitoring station 92.

Figure 8:
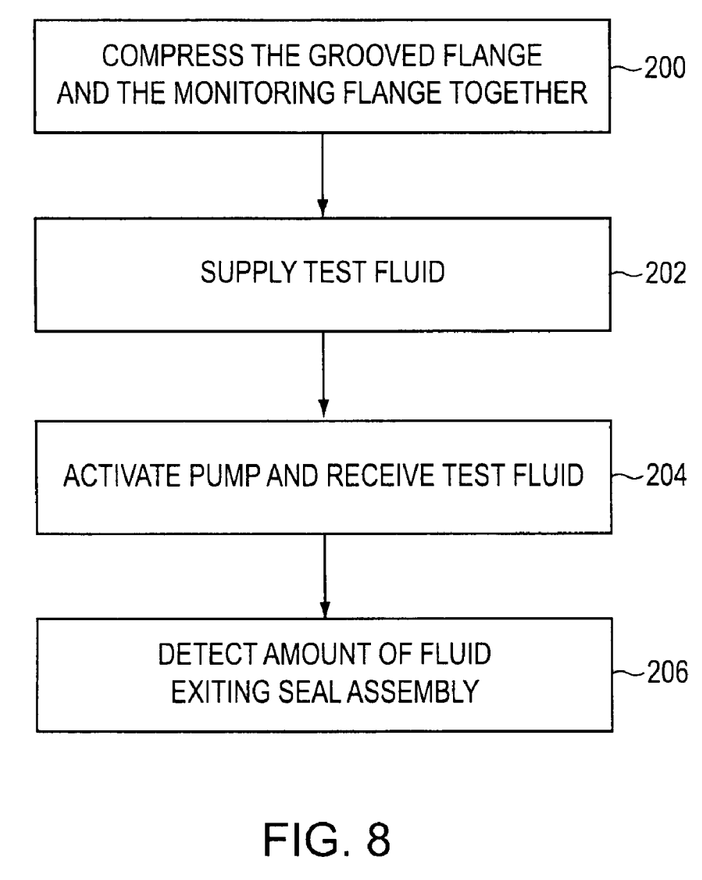
FIG. 8 is a flow chart of an exemplary method for performing a seal test.

FIG. 8 illustrates a method for performing a leak test on the seal assembly 34. For illustration purposes, a leak test performed on the first primary seal member 36 will be described. However, it should be understood that the same method may be used to test the second primary seal member 40. In addition, it contemplated that fluid may be supplied to either the inner loop supply port 52 or the outer loop supply port 54, but not both at the same time.

The method may begin at step 200 by compressing the grooved flange 14 and the monitoring flange 18 together to create the joint 22. Compressing the grooved flange 14 and the monitoring flange 18 together may compress the first and second primary seal members 36 and 40 and the first and second supplemental seal members 44 and 48. When compressed, the first and second primary seal members 36 and 40 and the first and second supplemental seal members 44 and 48 may form the central containment area 64, the inner loop containment area 66, and the outer loop containment area 68.

Next, in step 202, test fluid may be supplied to the inner loop supply conduit 58 from the inner loop supply port 52. The fluid supplied through the inner loop supply port 52 may be any type of fluid useful for detecting leaks such as, for example, helium gas and may be at any useful pressure to perform a leak test. Once fluid is supplied to the inner loop supply conduit 58, the fluid may flow though the inner loop supply groove 80 and the inner loop containment area 66. From the inner loop containment area 66, the fluid may flow to the first primary seal member 36.

After test fluid is supplied to the inner loop supply conduit 58, the pump 90 may be activated to create a desired pressure differential between the inner loop containment area 66 and the central containment area 64 (step 204). Creating the pressure differential may cause fluid inside the inner loop containment area 66 to flow through any defects in the first primary seal member 34 to the central containment area 64. After fluid begins flowing from the inner loop containment area 66 to the central containment area 64, fluid may flow through the central return groove 84 and the central return conduit 62 to the central return port 56. From the central return port 56, the fluid may flow through fluid passage 76 to the analyzer 88.

Next, in step 206, the analyzer 88 may detect an amount of fluid flowing through the fluid passage 76. The analyzer 88 may transmit data representing the amount of detected fluid to the central monitoring station 92, where the data can be analyzed to determine if maintenance is needed for the seal assembly 34. The method may be terminated after a desired amount of time.

Figure 9:
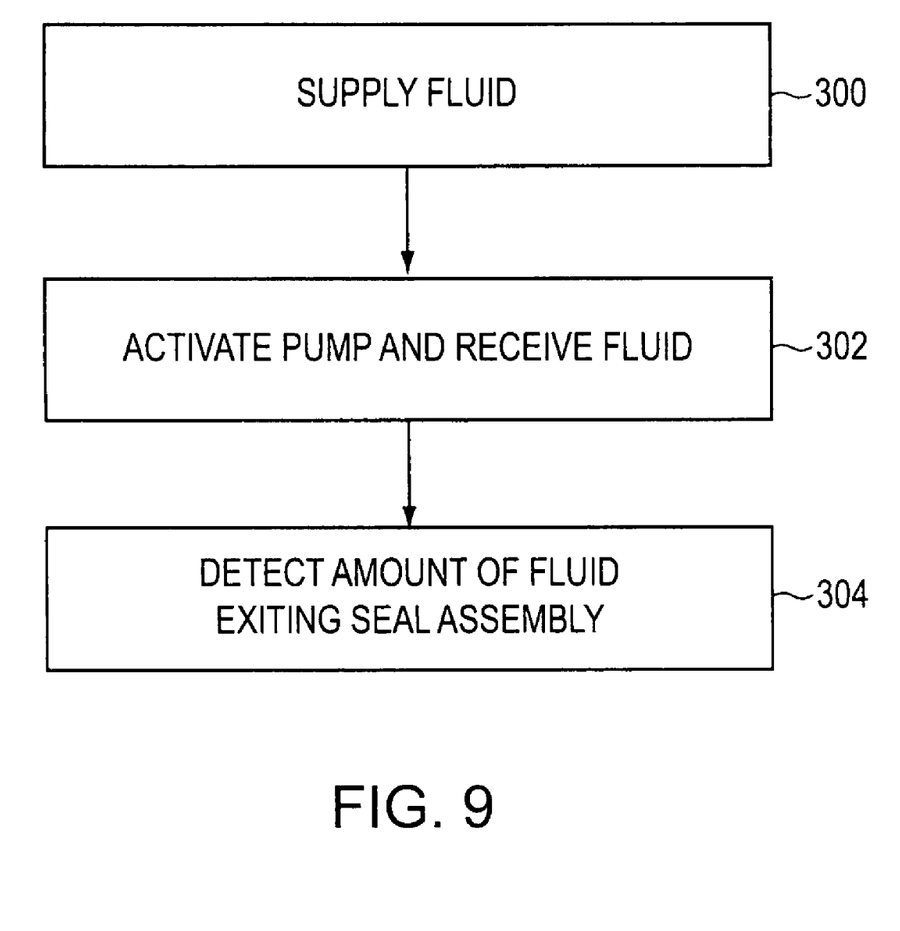
FIG. 9 is a flow chart of an exemplary method for monitoring a seal.

FIG. 9 illustrates a method for monitoring the seal assembly 34. The method may begin at step 300 by supplying fluid to the piping system 10. After fluid is supplied to the inner loop supply conduit 58, the pump 90 may be activated to create a desired pressure differential between the inner loop containment area 66 and the central containment area 64 and the outer loop containment area 68 (step 302).

Creating the pressure differential may cause fluid inside the inner loop containment area 66 to flow through any defects in the first primary seal member 34 to the central containment area 64. The pressure differential may also cause fluid to flow through any defects in the second primary seal member 40 to the outer loop containment area 68. After fluid begins flowing into the central containment area 64, fluid may flow through the central return groove 84 and the central return conduit 62 to the central return port 56. In addition, fluid flowing into the outer loop containment area 68 may flow through the outer loop supply groove 82 to the outer loop supply port 54. From the central return port 56 and the outer loop supply port 56, the fluid may flow through fluid passages 74, 76 and 104 to the analyzer 88.

Next, in step 304, the analyzer 88 may detect an amount of fluid flowing through the fluid passage 104. The analyzer 88 may transmit data representing the amount of detected fluid to the central monitoring station 92, where the data can be analyzed to determine if maintenance is needed for the seal assembly 34. The method may be continuously performed or may be terminated after a desired amount of time. As can be seen, by performing the method illustrated in FIG. 9, the integrity of the seal assembly 34 may be continuously monitored even while the piping system 10 is in operation.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A seal assembly for a joint between a first pipe segment having a first flange and a second pipe segment having a second flange, the seal assembly comprising:
   at least one primary sealing member mounted on the first flange and forming a loop around the first pipe segment;
   at least one supplemental sealing member mounted on the first flange between the first pipe segment and the at least one primary sealing member, the at least one supplemental sealing member forming a loop around the first pipe segment;
   a first sealed containment area that is formed between the at least one primary and at least one supplemental sealing members when the at least one primary and at least one supplemental sealing members are compressed; and
   a plurality of conduits formed in the first flange and extending from a first face of the first flange oriented away from the second flange to a second face of the first flange oriented toward the second flange, the plurality of conduits including:
      a first supply conduit located between the at least one primary sealing member and the at least one supplemental sealing member; and
      a return conduit located so that the at least one primary sealing member is positioned between the first supply conduit and the return conduit.

2. The seal assembly of claim 1, further including a first supply groove formed in a face of the second flange facing the first flange, the first supply groove forming a loop around the second pipe segment and being located adjacent to the first sealed containment area when the first and second flanges are coupled together.

3. The seal assembly of claim 1, further including at least a first primary sealing member, a second primary sealing member, a first supplemental sealing member and a second supplemental sealing member, the first and second primary sealing members and the first and second supplemental sealing members being mounted on a same face of the first flange.

4. The seal assembly of claim 3, wherein the plurality of conduits further includes a second supply conduit located between the second primary sealing member and the second supplemental sealing member, the first supply conduit being located between the first primary sealing member and the first supplemental sealing member.

5. The seal assembly of claim 3, wherein a second sealed containment area is formed between the second primary and second supplemental sealing members when the second primary and second supplemental sealing members are compressed and a third sealed containment area is formed between the first and second primary sealing members when the first and second primary sealing members are compressed.

6. The seal assembly of claim 5, further including a second supply groove formed in the same face of the second flange as the first supply groove, wherein the second supply groove forms a loop around the second pipe segment and is located adjacent to the second sealed containment area when the first and second flanges are coupled together.

7. The seal assembly of claim 6, further including a central return groove formed in the same face of the second flange as the first supply groove, wherein the central return groove forms a loop around the second pipe segment and is located adjacent to the third sealed containment area when the first and second flanges are coupled together.

8. A method for testing a leak rate of a seal assembly for a joint between a first pipe segment having a first flange and a second pipe segment having a second flange, the method comprising:
   forming a plurality of sealed containment areas by compressing the first and second flanges together, each of the sealed containment areas being formed by a surface of the first flange and a surface of the second flange;
   pressurizing one of the plurality of sealed containment areas by supplying a fluid to the one of the plurality of sealed containment areas via a supply conduit formed in the first flange; and
   creating a pressure differential between the pressurized sealed containment area and another sealed containment area to draw fluid from the pressurized sealed containment area to the another sealed containment area.

9. The method of claim 8, wherein the forming of the sealed containment areas further includes compressing a plurality of sealing member sets mounted on the first flange, each sealing member set including a primary sealing member and a supplemental sealing member, wherein each sealed containment area is formed by one sealing member set.

10. A method for testing a leak rate of a seal assembly for a joint between a first pipe segment having a first flange and a second pipe segment having a second flange, the method comprising:
   forming a plurality of sealed containment areas by compressing the first and second flanges together;
   pressurizing one of the plurality of sealed containment areas by supplying a fluid to the one of the plurality of sealed containment areas via a supply conduit formed in the first flange;
   creating a pressure differential between the pressurized sealed containment area and another sealed containment area to draw fluid from the pressurized sealed containment area to the another sealed containment area; and
   supplying fluid to the plurality of sealed containment areas via supply grooves formed on a surface of the second flange, each of the supply grooves being fluidly connected to a corresponding supply conduit formed in the first flange.

11. The method of claim 10, further including drawing fluid from the another containment area via a return groove formed on the surface of the second flange, the return groove being fluidly connected to a return conduit formed in the first flange.

12. The method of claim 10, wherein fluid is supplied to the seal assembly through a supply port formed in the first flange, and fluid is drawn from the seal assembly through a return port in the first flange.

13. A pipe assembly for transporting a fluid, the pipe assembly comprising:
   a plurality of pipe segments, each pipe segment including:
      a first flange located at a first end of the pipe segment;
      a second flange located at a second end of the pipe segment; and
      a seal assembly, the seal assembly including:
         at least one primary sealing member mounted on the first flange and forming a loop around the first pipe segment;

at least one supplemental sealing member mounted on the first flange between the first pipe segment and the at least one primary sealing member, the at least one supplemental sealing member forming a loop around the first pipe segment;

a first sealed containment area that is formed between the at least one primary and at least one supplemental sealing members when the at least one primary and at least one supplemental sealing members are compressed;

a first supply conduit located between the at least one primary sealing member and the at least one supplemental sealing member, wherein the first supply conduit is formed in the first flange and extends from a first face of the first flange oriented away from the second flange to a second face of the first flange oriented toward the second flange; and a return conduit located so that the at least one primary sealing member is positioned between the supply conduit and the return conduit formed in the first flange, wherein the return conduit extends from the first face of the first flange to the second face of the first flange.

14. The pipe assembly of claim 13, further including a first supply groove formed in a face of the second flange facing the first flange, the first supply groove forming a loop around the second pipe segment and being located adjacent to the first sealed containment area when the first and second flanges are coupled together.

15. The pipe assembly of claim 14, further including at least a first primary sealing member, a second primary sealing member, a first supplemental sealing member and a second supplemental sealing member, the first and second primary sealing members and the first and second supplemental sealing members being mounted on a same face of the first flange.

16. The pipe assembly of claim 15, further including a second supply conduit located between the second primary sealing member and the second supplemental sealing member, the first supply conduit being located between the first primary sealing member and the first supplemental sealing member, wherein the second supply conduit extends from the first face of the first flange to the second face of the first flange.

17. The pipe assembly of claim 15, wherein a second sealed containment area is formed between the second primary and second supplemental sealing members when the second primary and second supplemental sealing members are compressed and a third sealed containment area is formed between the first and second primary sealing members when the first and second primary sealing members are compressed.

18. The pipe assembly of claim 17, further including a second supply groove formed in the same face of the second flange as the first supply groove, wherein the second supply groove forms a loop around the second pipe segment and is located adjacent to the second sealed containment area when the first and second flanges are coupled together.

19. The pipe assembly of claim 17, further including a central return groove formed in the same face of the second flange as the first supply groove, wherein the central return groove forms a loop around the second pipe segment and is located adjacent to the third sealed containment area when the first and second flanges are coupled together.

\* \* \* \* \*

UNITED STATES PATENT AND TRADEMARK OFFICE
CERTIFICATE OF CORRECTION

Page 1 of 1

PATENT NO.       : 8,261,596 B2
APPLICATION NO.  : 12/656618
DATED            : September 11, 2012
INVENTOR(S)      : Lannie Douglas Harrison It is certified that error appears in the above-identified patent and that said Letters Patent is hereby corrected as shown below:

On the title page, Item (73), should read:

-- (73) Assignee:   Lockheed Martin Corporation, Bethesda, MD (US) --

Signed and Sealed this
Twenty-second Day of October, 2013

Teresa Stanek Rea
*Deputy Director of the United States Patent and Trademark Office*